(12) United States Patent
Miyagi et al.

(10) Patent No.: US 7,486,829 B2
(45) Date of Patent: Feb. 3, 2009

(54) APPARATUS AND METHOD FOR IMAGE PROCESSING, AND COMPUTER PRODUCT

(75) Inventors: Noriko Miyagi, Kanagawa (JP); Hirohisa Inamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 859 days.

(21) Appl. No.: 11/084,457

(22) Filed: Mar. 17, 2005

(65) Prior Publication Data

US 2005/0207661 A1    Sep. 22, 2005

(30) Foreign Application Priority Data

Mar. 18, 2004 (JP) ............... 2004-079291
Nov. 5, 2004 (JP) ............... 2004-322716

(51) Int. Cl.
*G06K 9/36* (2006.01)

(52) U.S. Cl. ............... 382/232; 382/248; 382/199; 382/166

(58) Field of Classification Search ............... 382/232, 382/238, 240, 248, 199, 166; 341/50; 704/E19.005; 359/554; 348/208.99, 208.5, E3.02; 375/240.11, 375/240.21, 240.25, E7.14, E7.145, 241
See application file for complete search history.

(56) References Cited

U.S. PATENT DOCUMENTS

| | | | | |
|---|---|---|---|---|
| 4,623,930 A | * | 11/1986 | Oshima et al. | 348/208.5 |
| 4,856,882 A | * | 8/1989 | Oshima et al. | 359/554 |
| 5,020,890 A | * | 6/1991 | Oshima et al. | 359/554 |
| 7,020,335 B1 | * | 3/2006 | Abousleman | 382/199 |

FOREIGN PATENT DOCUMENTS

| | | |
|---|---|---|
| JP | 2-153676 A | 6/1990 |
| JP | 8-317393 A | 11/1996 |
| JP | 9-149260 A | 6/1997 |
| JP | 2001-277602 A | 10/2001 |

* cited by examiner

*Primary Examiner*—Anh Hong Do
(74) *Attorney, Agent, or Firm*—Blakley, Sokoloff, Taylor & Zafman LLP

(57) ABSTRACT

In an image processing apparatus, a pseudo tone processor performs a pseudo tone process by performing an area coverage modulation expression process with respect to M-bit image data, to thereby convert the M-bit image data into N-bit image data, where N is smaller than M. A lossy compressor performs lossy compression with respect to the N-bit image data, by suppressing fluctuations in a pseudo tone processing frequency within a certain range.

20 Claims, 16 Drawing Sheets

FIG. 2A
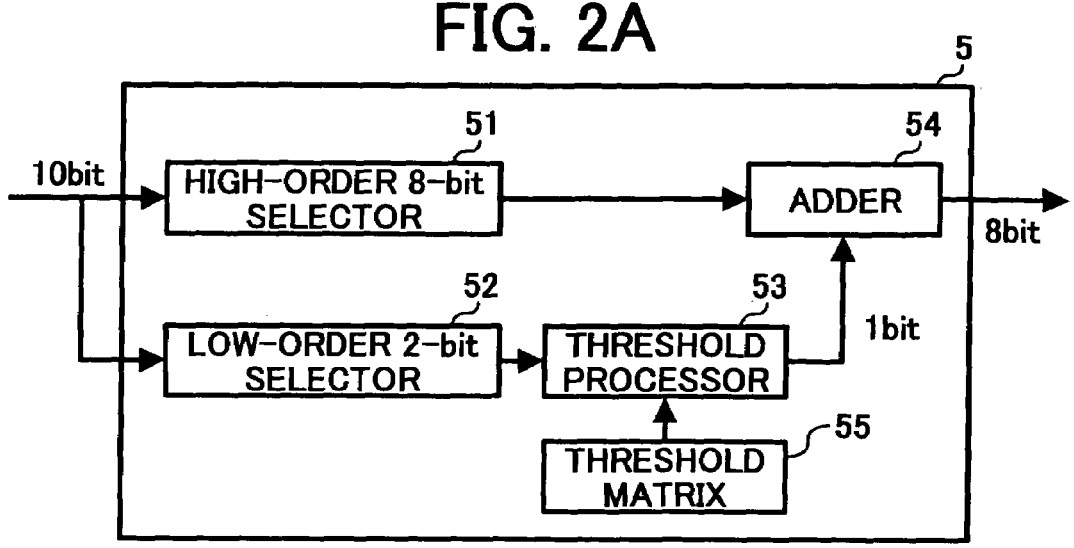
FIG. 2B
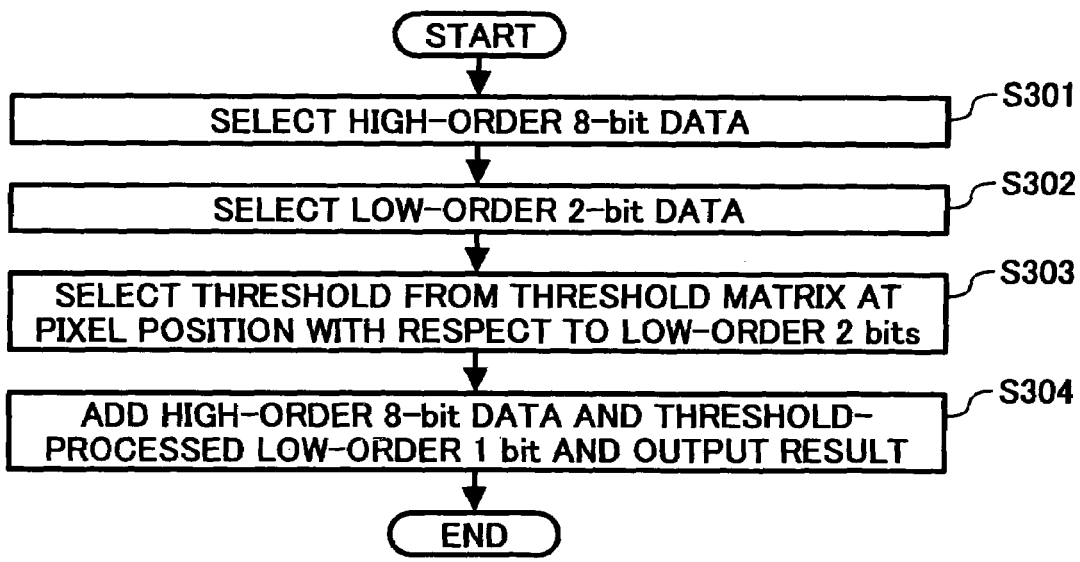
FIG. 2C
| 0 | 1 |
|---|---|
| 2 | 3 |

FIG. 5
STANDARD QUANTIZATION TABLE Qij FOR LUMINANCE COMPONENTS
| | i=0 | 1 | 2 | 3 | 4 | 5 | 6 | 7 |
|---|---|---|---|---|---|---|---|---|
| j=0 | 16 | 11 | 10 | 16 | 24 | 40 | 51 | 61 |
| 1 | 12 | 12 | 14 | 19 | 26 | 58 | 60 | 55 |
| 2 | 14 | 13 | 16 | 24 | 40 | 57 | 69 | 56 |
| 3 | 14 | 17 | 22 | 29 | 51 | 87 | 80 | 62 |
| 4 | 18 | 22 | 37 | 56 | 68 | 109 | 103 | 77 |
| 5 | 24 | 35 | 55 | 64 | 81 | 104 | 113 | 92 |
| 6 | 49 | 64 | 78 | 87 | 103 | 121 | 120 | 101 |
| 7 | 72 | 92 | 95 | 98 | 112 | 100 | 103 | 99 |
50a
STANDARD QUANTIZATION TABLE Qij FOR COLOR DIFFERENCE COMPONENTS
| | i=0 | 1 | 2 | 3 | 4 | 5 | 6 | 7 |
|---|---|---|---|---|---|---|---|---|
| j=0 | 17 | 18 | 24 | 47 | 99 | 99 | 99 | 99 |
| 1 | 18 | 21 | 26 | 66 | 99 | 99 | 99 | 99 |
| 2 | 24 | 26 | 56 | 99 | 99 | 99 | 99 | 99 |
| 3 | 47 | 66 | 99 | 99 | 99 | 99 | 99 | 99 |
| 4 | 99 | 99 | 99 | 99 | 99 | 99 | 99 | 99 |
| 5 | 99 | 99 | 99 | 99 | 99 | 99 | 99 | 99 |
| 6 | 99 | 99 | 99 | 99 | 99 | 99 | 99 | 99 |
| 7 | 99 | 99 | 99 | 99 | 99 | 99 | 99 | 99 |
50b
FIG. 6A
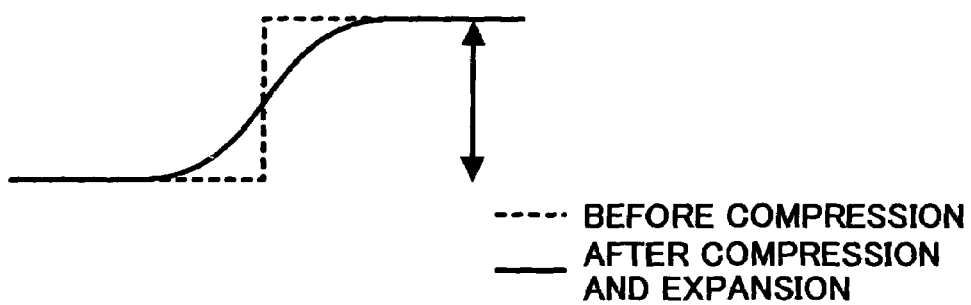
---- BEFORE COMPRESSION
—— AFTER COMPRESSION AND EXPANSION
FIG. 6B
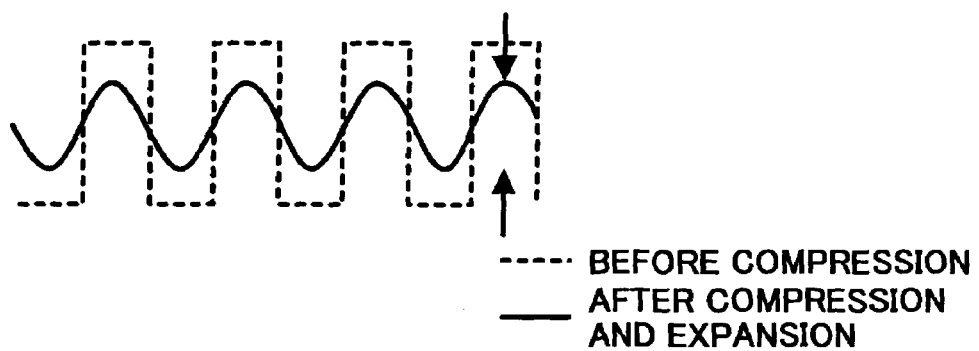
---- BEFORE COMPRESSION
—— AFTER COMPRESSION AND EXPANSION

APPARATUS AND METHOD FOR IMAGE PROCESSING, AND COMPUTER PRODUCT

The present application claims priority to and incorporates by reference the entire contents of Japanese priority documents, 2004-079291, filed in Japan on Mar. 18, 2004, and 2004-322716 filed in Japan on Nov. 5, 2004.

BACKGROUND OF THE INVENTION

1. Field of the Invention

The present invention relates to an apparatus and a method for image processing, and a computer product in which a tone corresponding to bits in an image in preserved, and mean value preservability and the visual performance can be substantially obtained.

2. Description of the Related Art

Conventionally, in a color copying machine having an image storage unit such as a hard disk, an image read by a scanner is stored in the hard disk, and transmitted to external equipment. Considering storage capacity and transmission speed, images are generally compressed before storing or transmitting. Another conventional apparatus is one in which lossy compression is employed, as represented by Joint Photographic Experts Group (JPEG). In the lossy compression method, high compression efficiency can be expected with a little effect on the image quality, depending on the image. The JPEG images can be displayed on a display unit using general-purpose software on a personal computer (PC), and hence its accessibility is excellent. To output an image as a copied image, an image stored must be read out, and subjected to image processing for reproducing the image.

The method in JPEG adapted by most types of general-purpose software is a baseline method of JPEG, and its limitation is that the number of bits in the baseline method is 8 bits for each color. However, sometimes, it is desired to store an image expressed by more than 8 bits. The most noticeable example is when the number of input bits in an input unit (scanner) is larger than 8 bits. In fact, a 12-bit input unit (scanner) is available in the market. Using 12 bits in the input stage reduces quantization errors. Further, when processing such as nonlinear operation and color space conversion is performed during scanner input and storing of images, a number of bits may be required to approximate these conversions to reversible conversion. This is because quantization errors should be reduced to approximate the conversion to the reversible conversion. In the nonlinear operation, in which complete reversible conversion requires real number calculation, as the number of bits increases, quantization errors decreases, and approximates to the real number calculation.

The color space conversion method is specifically explained here. It is an effective technique to store the color space signals in a hard disk, and does not depend on devices such as an input unit and an output unit. Moreover, an advantage of the color space conversion is that color reproducibility does not change even when the input unit or the output unit changes. sRGB (standard-RGB), sYCC, and scRGB are well-known device-independent color spaces. However, sRGB has a narrow color gamut, requires gamut compression with respect to the input image from a scanner, and has poor color reproducibility. On the other hand, sYCC and scRGB have substantially sufficient color gamut, but due to problems such as the size of the color gamut and quantization errors, it is necessary to express an image with a larger number of bits than in sRGB. To store a JPEG-compressed image expressed by a large number of bits, a bit number reduction unit is necessary. However, if low-order 2-bits are simply omitted, there is a problem in that a pseudo profile that is not visible in the case of 10-bit expression is visible in some images.

(1) Japanese Patent Application Laid-open No. H2-153676 discloses an image forming apparatus that converts high-tone image data of N bits into N-m bit data. In this technique, low-order M bits of the N bit data are binarized, and high-order N-m bits of the N bit data are combined with the binarized one-bit data, to generate N-m bit data. Expressing the low-order M bits corresponding to the omitted portion by pseudo tone and binarizing the M bits, enables to store the tone corresponding to N bits by area coverage modulation, and to thus prevent occurrence of a pseudo profile. Such a technique has been in use when there is a limitation in the number of tones that can be displayed by a display unit, or when there is a limitation in the number of bits to be transmitted, and the like, and particularly for displaying on a television screen.

However, reduction in number of bits executed on the television is not executed by assuming subsequent lossy compression because a lossy compressor is not included. Even in the conventional art, in which the number of bits is reduced by using pseudo tone processing for data transmission, lossless compression is assumed in most cases. On the other hand, an apparatus having a lossy compressor such as the JPEG, executes lossy compression after reducing the number of bits from 10 bits to 8 bits. If pseudo tone processing is performed with respect to an image to reduce the number of bits from 10 bits to 8 bits and then the JPEG processing is performed, there is a problem in that information for the low-order 2 bits subjected to the pseudo tone processing is almost lost, depending on the pseudo tone processing. In the lossy compression, because the compressibility is increased by unsmoothing a quantization step for high frequency components, the loss occurs when the information for the low-order 2 bits is present just in the place where it is unsmooth in the quantization step.

(2) Further, there are few apparatuses that perform lossy compression such as JPEG after performing the pseudo tone processing. Japanese Patent Application Laid-open No. H8-317393 discloses an image forming technique in which JPEG compression is performed after error diffusion (or dither processing). In this technique, after the number of bits is reduced from 8 bits to 4 bits by error diffusion, "0000" is added to the low-order bits to form 8-bit data, and the data is JPEG-compressed and stored in an image memory. However, the object of this technique is to reduce the storage capacity of the image memory (a memory used for a blocking unit 61 in FIG. 3), and not preservation of tone after the lossy compression, nor preservation of tone corresponding to 10 bits, which is the number of bits equal to or larger than the bits at the time of JPEG compression. There is also a problem that when compressed data is transmitted to external equipment and displayed on a monitor a halftone image is visible (noticeability of error diffusion or dither basic tone).

(3) Japanese Patent Application Laid-open No. 2001-277602 discloses an apparatus in a printer system that performs image processing and compression processing suitable for each object, where the halftone processing is included in the image processing, and performs error diffusion and dither processing. In some cases, the compressibility is switched.

(4) Further, Japanese Patent Application Laid-open No. H9-149260 discloses an image forming apparatus that performs compression after the dither processing, and in which an amount of generated code of compressed data is monitored. As long as the amount of code is within an allowable range, multi-level dither processing and lossless compression are performed. Only when the amount of code exceeds the allowable range, the processing method is switched to binary dither processing and lossy compression.

The technique in (1) is a practical technique for displaying images on the television screen, but the number of bits is not reduced by assuming the lossy compression, because the lossy compressor is not provided in the stage after reduction of number of bits. The technique in (2) is for reducing the storage capacity of the image memory, and does not aim at preserving the tone after the lossy compression, nor at preserving the tone corresponding to 10 bits, which are larger than those at the time of JPEG compression. Therefore, the problem that a halftone image appears when compressed data is transmitted to external equipment and displayed on a monitor, still persists. The techniques in (3) and (4) include lossy compression after the halftone processing only when the compressibility is prioritized, and hence, do not include a function of maintaining the tone.

SUMMARY OF THE INVENTION

An apparatus and method for image processing and computer product are described. In one embodiment, the image processing apparatus comprises a pseudo tone processor that performs a pseudo tone process by performing an area coverage modulation expression process with respect to M-bit image data to convert the M-bit image data to N-bit image data, where N is smaller than M, and a lossy compressor that performs lossy compression with respect to the N-bit image data by suppressing fluctuations in a pseudo tone processing frequency within a certain range.

BRIEF DESCRIPTION OF THE DRAWINGS

FIG. 2A is a functional block diagram of a pseudo tone processor;

FIG. 2B is a diagram to illustrate a procedure of the pseudo tone processing;

FIG. 2C illustrates an example of a threshold value used by a threshold processor;

FIG. 5 illustrates examples of standard quantization tables;

FIGS. 6A and 6B are diagrams to illustrate degradation in an image before and after JPEG compression and expansion;

DETAILED DESCRIPTION

An embodiment of the present invention to at least solve the problems described above in the conventional technology.

An image processing apparatus according to an embodiment of the present invention includes a pseudo tone processor that performs a pseudo tone process by performing an area coverage modulation expression process with respect to M-bit image data, to thereby convert the M-bit image data to N-bit image data, wherein N is smaller than M; and a lossy compressor that performs lossy compression with respect to the N-bit image data by suppressing fluctuations in a pseudo tone processing frequency within a certain range.

An image processing apparatus according to another embodiment of the present invention includes a pseudo tone processor that performs a pseudo tone process by performing an area coverage modulation expression process with respect to image data, to thereby reduce a number of bits of the image data; a lossy compressor that performs lossy compression with respect to the image data subjected to the pseudo tone process; an edge extractor that extracts an edge amount from the image data before the lossy compression; and an image synthesizing unit that synthesizes the image data subjected to the lossy compression and the edge amount extracted.

An image processing method according to still another embodiment of the present invention includes pseudo tone processing by performing an area coverage modulation expression process with respect to M-bit image data, thereby converting the M-bit image data to N-bit image data, wherein N is smaller than M; and performing lossy compression with respect to the N-bit image data by suppressing fluctuations in a pseudo tone processing frequency within a certain range.

An image processing method according to still another embodiment of the present invention includes pseudo tone processing by performing an area coverage modulation expression process with respect to image data, thereby reducing a number of bits of the image data; performing lossy compression with respect to the image data subjected to the pseudo tone process; extracting an edge amount from the image data before the performing; and synthesizing the image data subjected to the lossy compression and the edge amount extracted.

Computer-readable recording media according to other embodiments of the present invention store thereon a computer program that implement on a computer the above methods according to one embodiment of the present invention.

The other embodiments, features, and advantages of the present invention are specifically set forth in or will become apparent from the following detailed description of the invention when read in conjunction with the accompanying drawings.

Exemplary embodiments of the present invention will be explained below with reference to the accompanying drawings.

Figure 1A:
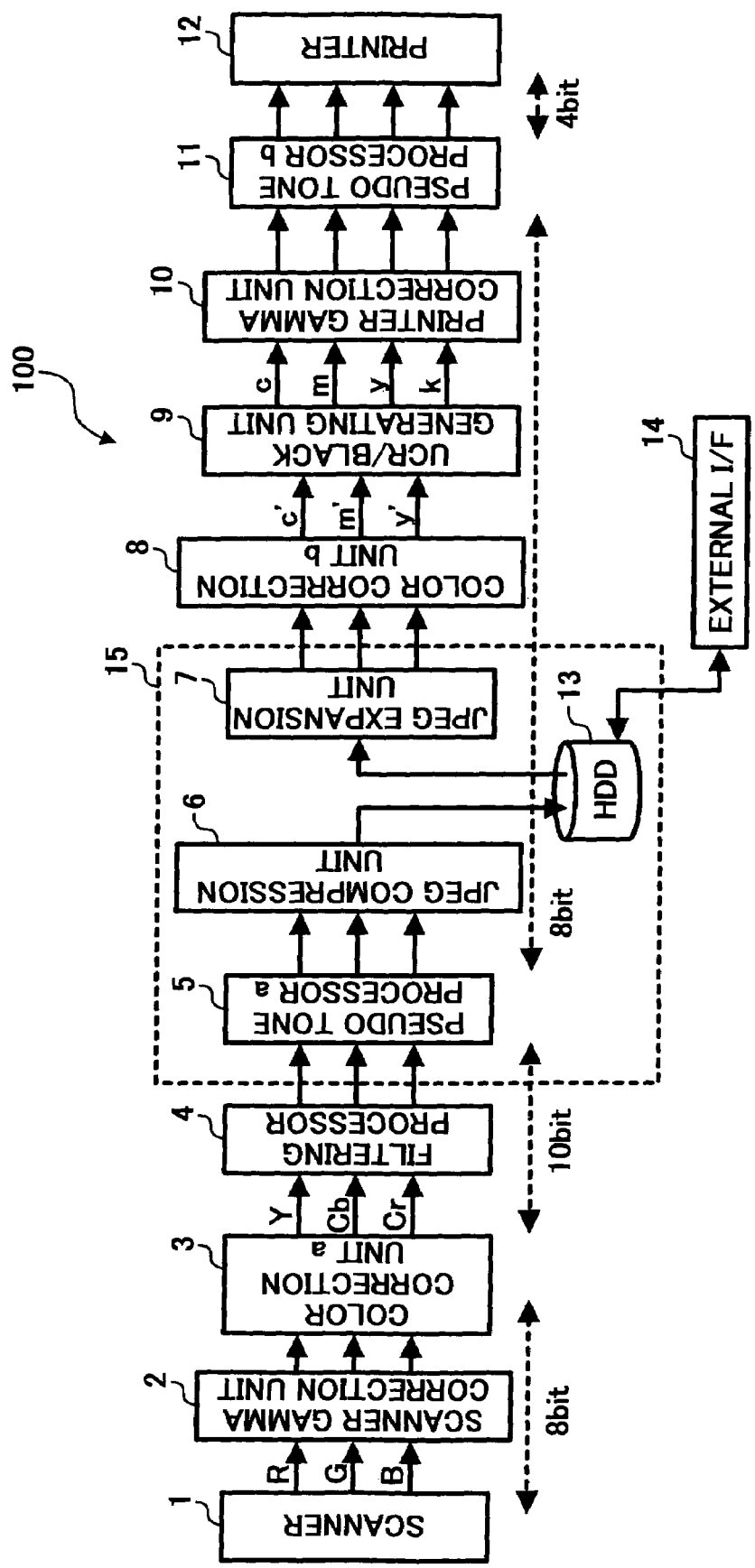
FIG. 1A is a functional block diagram of an image forming apparatus according to an embodiment of the present invention.

FIG. 1A is a functional block diagram of an image forming apparatus according to an embodiment of the present invention.

An image processing apparatus 15 according to the embodiment is provided in an image forming apparatus 100. The image processing apparatus 15 includes a pseudo tone processor a 5, a JPEG compression unit 6, a JPEG expansion unit 7, and a hard disc drive (HDD) 13 that at least temporarily stores image data compressed by the JPEG compression unit 6. The HDD 13 transfers data via an external interface (I/F) 14 that is an interface to external equipment.

Figure 1B:
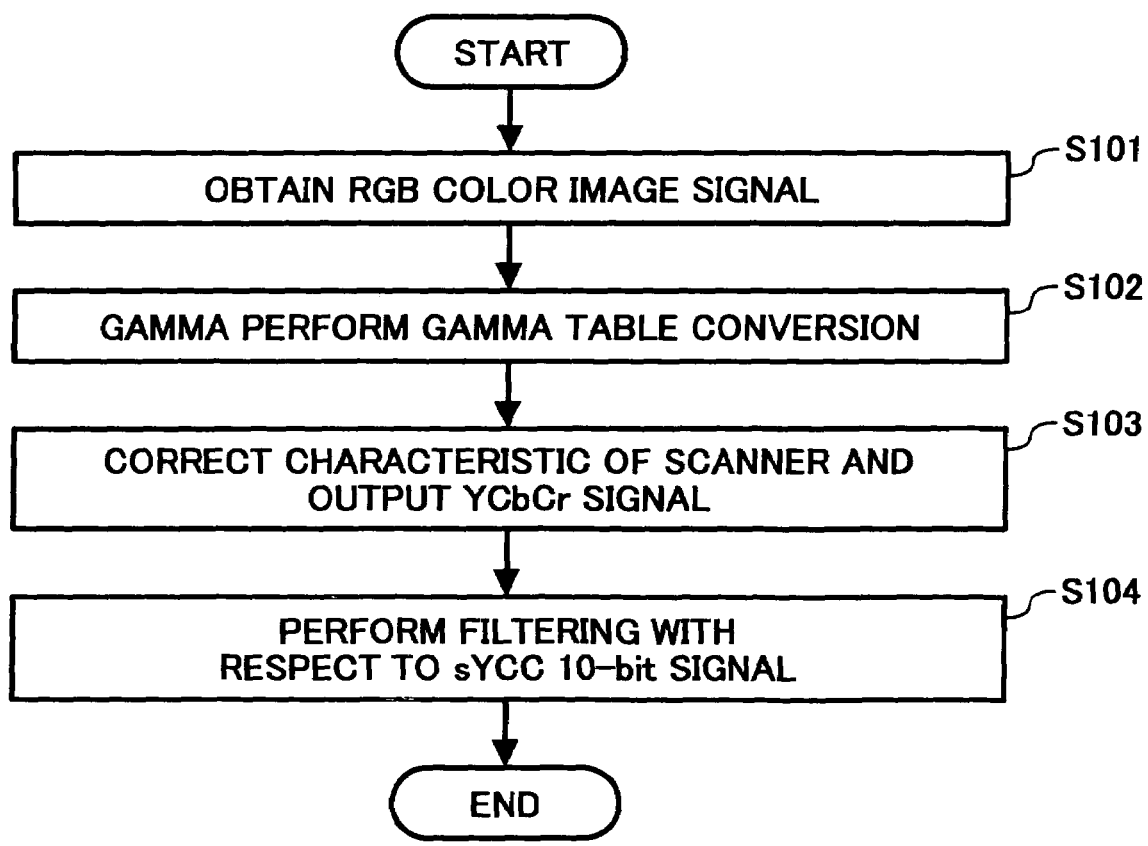
FIG. 1B is a flowchart of process procedures, from image input by a scanner to filter processing, performed in the image processing apparatus.

FIG. 1B is a flowchart of process procedures, from image input by a scanner to filter processing, performed in the image processing apparatus. In the image forming apparatus 100, a scanner 1 obtains a color image signal formed of red, green, and blue (RGB) (step S101), a scanner gamma correction unit 2 performs a gamma table conversion (step S102), and a color correction unit a 3 corrects the characteristics of the scanner to output a device-independent YCbCr signal (sYCC signal) (step S103). The scanner gamma correction unit 2 performs Y linear connection to improve the precision of the color correction unit a 3.

The color correction unit a 3 performs hue split-type color correction. A 10-bit YCbCr signal is output with respect to 8-bit signal of RGB. The sYCC (standard-YCbCr) is a standard color space, in which a color gamut is widened with respect to sRGB obtained by linear transformation of the sRGB that is a standard color space for color display. However, the sYCC requires a larger number of bits than the sRGB, to set the tone thereof to the same level as that of sRGB. Therefore, when the sRGB requires 8 bits respectively, the sYCC requires about 10 bits respectively.

A filtering processor 4 performs filtering including smoothing and edge reinforcement with respect to the sYCC 10-bit signals, and the pseudo tone processor a 5 reduces the number of bits, by area coverage modulation, to output 8-bit sYCC signals (step S104).

Figure 1C:
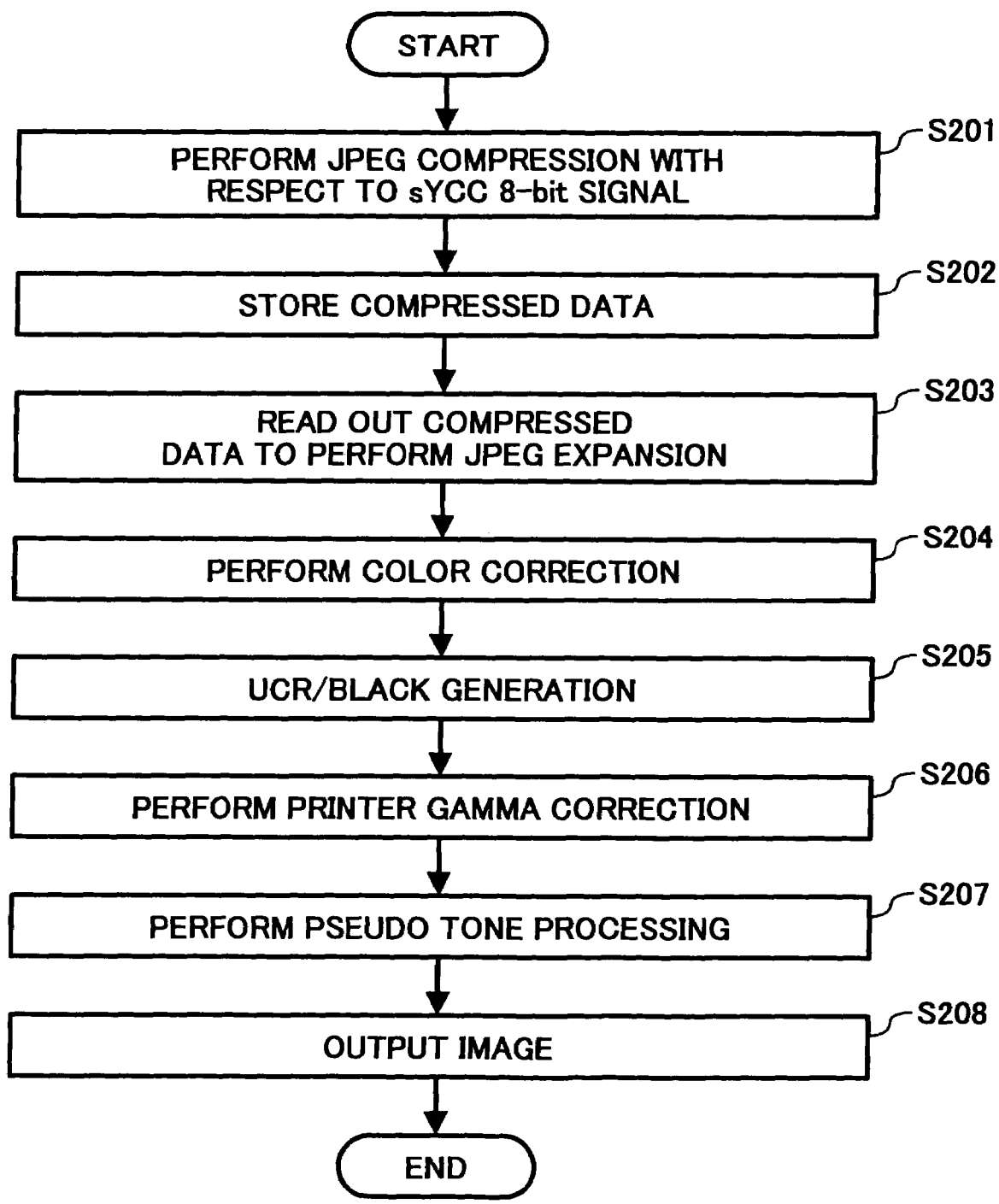
FIG. 1C is a flowchart of process procedures from JPEG compression to image output by a printer.

FIG. 1C is a flowchart of process procedures until a printer outputs the image after a JPEG compression unit has received an sYCC signal, with the number of bits thereof reduced by a pseudo tone processor. The JPEG compression unit 6 performs JPEG compression with respect to the sYCC 8-bit signal in which the number of bits has been reduced (step S201), and stores the compressed data in the HDD 13 (step S202). In the case of a reproduction procedure in the normal image formation, the compressed data stored once is read immediately, and the JPEG expansion unit 7 performs expansion processing (step S203), a color correction unit b 8 performs color correction (step S204), and a UCR/black generating unit 9 performs UCR/black generation processing (step S205) to convert the data to a CMYK signal corresponding to the toner color of the printer. A printer gamma correction unit 10 performs gamma correction (step S206), a pseudo tone processor b 11 performs pseudo tone processing (step S207), and a printer 12 outputs an image (step S208).

The pseudo tone processor b 11 performs dither processing or error diffusion processing for printer output with respect to the image data, to create the number of bits that are required for printer output (4 bits). The compressed data stored in the HDD 13 may also be transmitted from the external I/F 14 to the external equipment, or input from the external equipment, other than the normal copying procedure. For example, an image transmitted to an external PC may be displayed on a color monitor for observation and editing.

FIG. 2A is a functional block diagram of the pseudo tone processor. The pseudo tone processor a 5 converts 10 bits to 8 bits. A low-order two-bit selector 52 selects the low-order two bits to be omitted, and a threshold processor 53 binarizes the low-order two bits selected, into a 1-bit signal. The threshold processor 53 uses a threshold value, corresponding to a pixel position, which is set in a threshold matrix 55. A high-order 8-bit selector 51 selects the high-order 8 bits of the 10 bits. An adder 54 adds the 1-bit signal to the least significant bit (LSB) of the high-order 8 bits selected.

FIG. 2B is a diagram to illustrate a procedure in which the pseudo tone processor performs pseudo tone processing to reduce the number of bits. FIG. 2C illustrates an example of a threshold value used by the threshold processor. The procedure in the pseudo tone processing according to the embodiment will be specifically explained with reference to FIGS. 2A to 2C.

As an example, when a 10-bit binary input is "1000000011" (515 in decimal), the high-order 8-bit selector 51 selects "10000000", being the high-order 8 bits (step S301). The low-order 2-bit selector 52 selects "11", being the low-order 2 bits (step S302). The threshold processor 53 compares the low-order 2 bits "11" (3 in decimal) with a threshold value. If larger than the threshold value, the threshold processor 53 outputs "1", and if smaller than the threshold value, the threshold processor 53 outputs "0" (step S303). If the threshold value is 2 in decimal, the output from the threshold processor 53 becomes "1". An adder 54 adds high-order 8 bits, "10000000", and "1" from the threshold processor 53, to output "10000001" (step S304).

The threshold value is different depending on the pixel position. For example, when the value "1000000011" is input to the threshold processor 53 for all of 2×2 pixels, if the threshold value is changed for each pixel as in an example shown in FIG. 2C, the output from the pseudo tone processor a 5 becomes "10000001" (129 in decimal) for the upper left pixel, "10000001" (129 in decimal) for the upper right pixel, "10000001" (129 in decimal) for the lower left pixel, and "10000000" (128 in decimal) for the lower right pixel. The mean value of 2×2 pixels is 128+(¾) in decimal, and (128+(¾))×4=515 is calculated as a mean value, thereby storing the mean value of 515. Here, (128+(¾)) is multiplied by 4 for considering the value as a 10-bit value.

Figure 3:
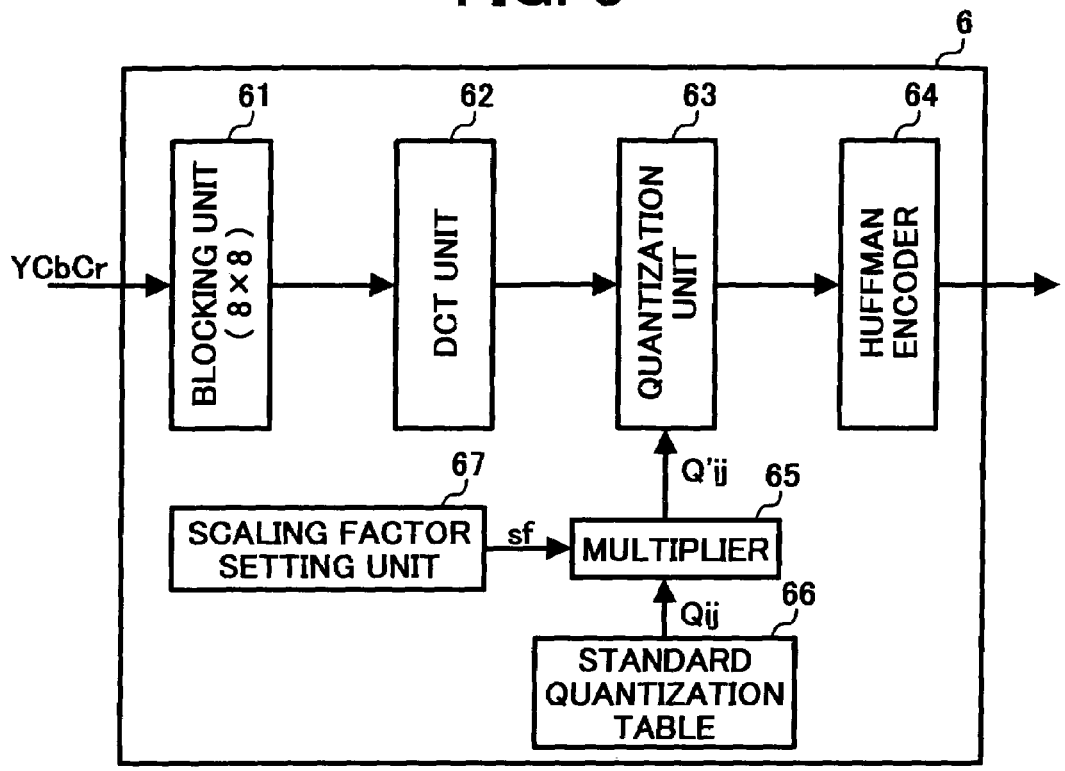
FIG. 3 is a functional block diagram of a JPEG compression unit.
Figure 4:
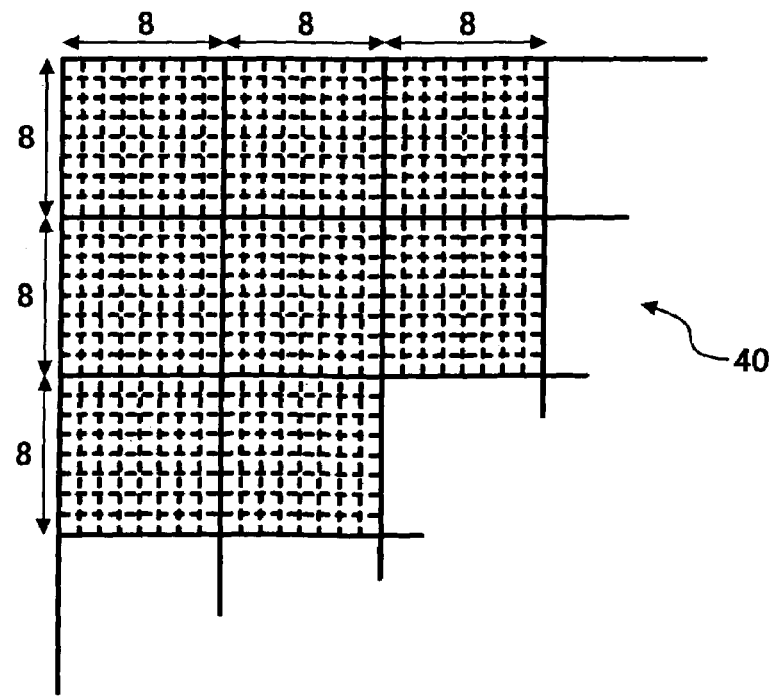
FIG. 4 is a diagram to illustrate a process procedure of cutting out image data into block units.

FIG. 3 is a functional block diagram of the JPEG compression unit 6. FIG. 4 is a diagram to illustrate the process procedure of cutting out image data into block units. The JPEG method is an international standard method, and the image is cut out in a unit of 8×8 pixel as shown in the figure. The JPEG compression unit 6 includes a blocking unit 61, a discrete cosine transform (DCT) unit 62, a quantization unit 63, and a Huffman encoder 64. The blocking unit 61 cuts out the image in a unit of 8×8 pixels, and the DCT unit 62 performs discrete cosine transform with respect to the cut out DCT block data, and changes the data to a frequency space.

The quantization unit 63 that performs quantization processing, which controls a compression level, will be explained later. A standard quantization table 66 includes separate standard quantization tables for Y components and CbCr components.

FIG. 5 illustrates examples of standard quantization tables Qij. The upper left corner Q00 of the 8×8 block is a parameter used for quantization of direct current components (DC components), and the remainder is a parameter used for quantization of alternating current components (AC components). The closer to the upper left corner, the lower the frequency component, and the closer to the lower right corner, the higher the frequency component. Quantization is performed by dividing a DCT coefficient of 8×8, being an output value from the DCT unit 62, by a quantization table value Q'ij. The larger the quantization table value Q'ij, the larger the loss due to quantization (=large quantization), and it is the old trick to increase the compressibility by increasing quantization of the high frequency components as shown in FIG. 5, with little influence to the image quality.

With respect to the standard quantization table Qij, the quantization table value Q'ij actually used in quantization is determined by the following expression:

$$Q'ij = Qij \times sf,$$

where sf denotes a fixed parameter set in a scaling factor setting unit 67, and is set within a range of 0<sf<1. The smaller the sf, the lower the compressibility and the higher the image quality.

FIGS. 6A and 6B are diagrams to explain degradation in an image before and after JPEG compression and expansion. Not only in the JPEG but also with lossy compression, the high frequency components are attenuated, and hence, a dull image with a smooth corner is obtained, as observed at the micro level. FIG. 6A illustrates degradation in an image with density fluctuations in low frequencies, and FIG. 6B illustrates degradation in an image with density fluctuations in high frequencies. The density axis is in the vertical direction in the figure. As shown in FIGS. 6A and 6B, the image becomes dull in the image after compression and expansion. While a difference in tone (a fluctuation margin of density fluctuations) is stored in the case of FIG. 6A, it is not in the case of FIG. 6B. If there is a larger attenuation in the high frequency components due to compression than the attenuation shown in the figure, the amplitude in the density fluctuations shown in FIG. 6B becomes zero, and undulations disappear. That is, when the difference in tone of the density fluctuations is 1, the difference in tone becomes 0 after the compression. For example, when the density on the low density side in the density fluctuations before the compression is 10, and the density on the high density side is 11, then after the compression and expansion, density fluctuation becomes zero, and the density of all pixels becomes 10 or 11, and the mean value (in this case, 10.5) is stored in the case of FIG. 6A, but may not be stored in the case of FIG. 6B, according to the degree of compression.

Figure 7:
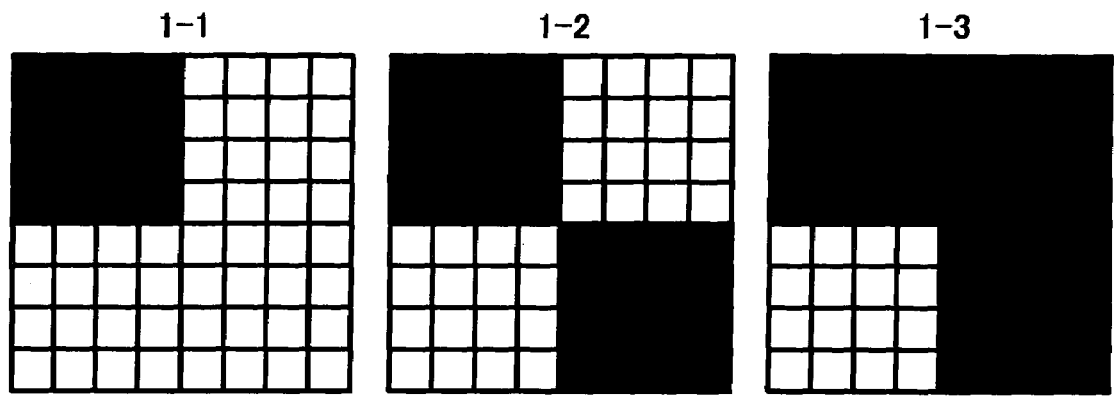
FIG. 7 illustrates an example of a 1-bit pattern after threshold value processing by the threshold processor.
Figure 8:
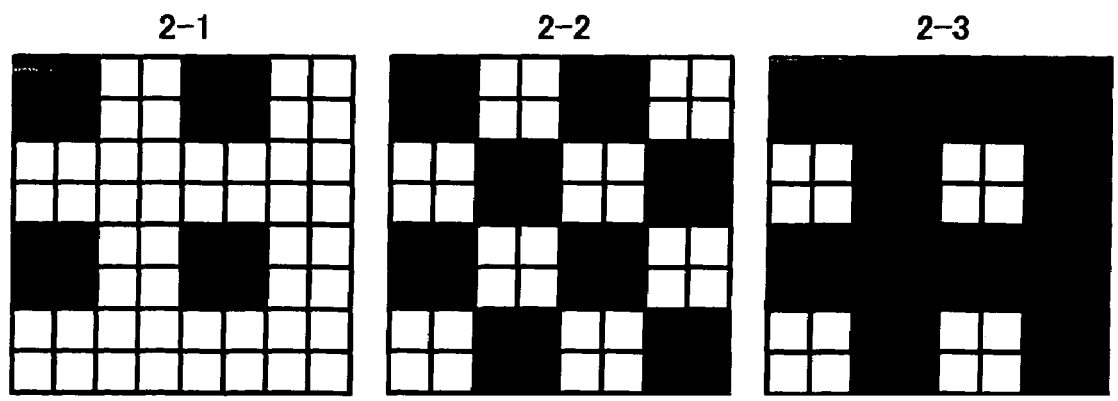
FIG. 8 illustrates a second example of a 1-bit pattern after the threshold value processing.
Figure 9:
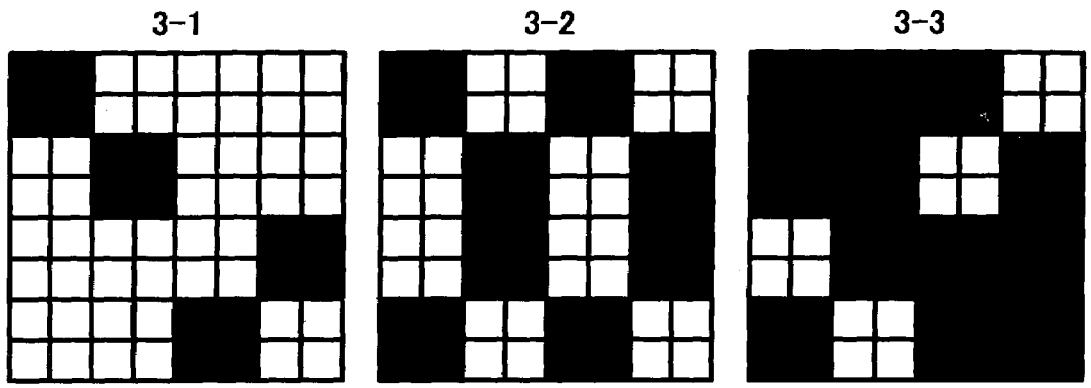
FIG. 9 illustrates a third example of a 1-bit pattern after the threshold value processing.

FIGS. 7 to 9 illustrate examples of the 1-bit patterns after threshold value processing by the threshold processor 53. For the brevity of explanation, an instance in which all 8×8 pixels have the same 10-bit value is considered here. For example, when the low-order 2 bits are "01", the 1-bit pattern in 1-1 of FIG. 7 is added to the LSB of the high-order 8 bits, when the low-order 2 bits are "10", the 1-bit pattern in 1-2 of FIG. 7 is added to the LSB of the high-order 8 bits, and when the low-order 2 bits are "11", the 1-bit pattern in 1-3 of FIG. 7 is added to the LSB of the high-order 8 bits, thereby storing information corresponding to 10 bits as an average density of the 8×8 pixels. A threshold matrix included in the threshold matrix 55 (FIG. 2) is set to a threshold matrix corresponding to the 8×8 pixels generated by such a dither pattern. The same applies to FIGS. 8 and 9, but the dither pattern in FIG. 8 can be realized by a threshold matrix corresponding to 4×4 pixels.

In deciding the dither pattern, if the human visual performance is taken into consideration, the low frequency component is noticeable and is perceived as noise, whereas the high frequency component is not noticeable. Taking the JPEG compression into consideration, there is a problem in that as the frequency becomes higher, it becomes more difficult to preserve the average density due to the reason explained above.

Figure 10:
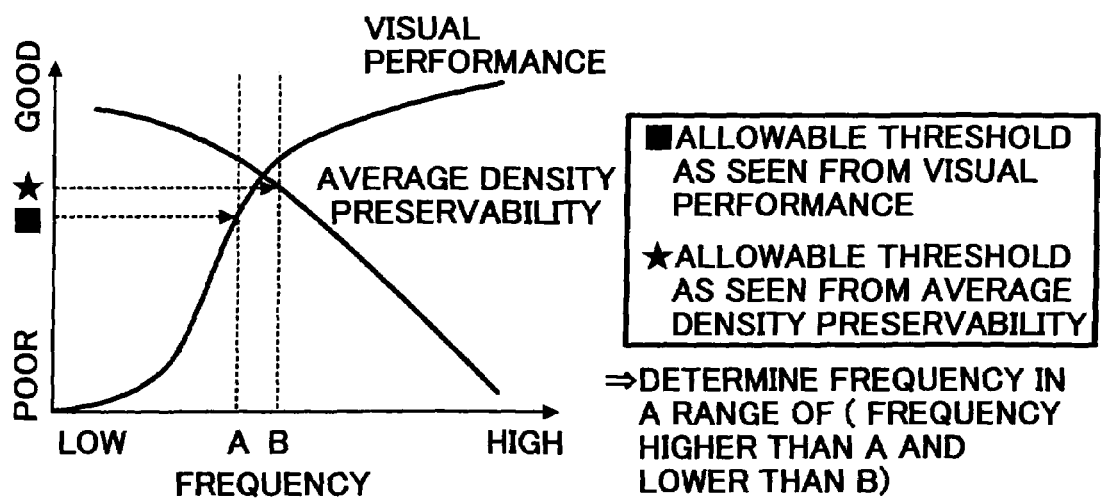
FIG. 10 is a diagram to illustrate a relation between visual performance and average density preservability by JPEG.

FIG. 10 is a diagram to explain the relation between the visual performance and the average density preservability by the JPEG. A frequency A corresponds to an allowable threshold value in view of the visual performance, and a frequency B corresponds to an allowable threshold value in view of the average density preservability. If the dither pattern is set to have the frequency characteristic in a range of higher than A and lower than B, both allowable threshold values can be satisfied. Because the average density preservability depends on the quantization table value Q'ij for compression, and the visual performance depends on an observation distance or the like, the relation between these cannot be mentioned indiscriminately. In relation to the average density preservability, for example, in the case of the dither pattern shown in FIG. 7, many pieces of information are present at a frequency corresponding to a quantization table value Q'11 for luminance components, and the value of Q'11 largely contributes to the average density preservability. In the case of the dither patterns shown in FIGS. 8 and 9, many pieces of information are present at a frequency corresponding to Q'33, and the value of Q'33 largely contributes to the average density preservability.

In order to preserve the average density corresponding to 10 bits within an area corresponding to the JPEG 8×8 blocking, it is desirable to preserve the average density at intervals of 0.25. For example, between the average densities of 10 and 11, it is desirable to preserve three average density steps of 10.25, 10.50, and 10.75.

On the other hand, the threshold value in view of the average density preservability (which can be regarded also as an allowable threshold value with respect to Q'ij) can preserve the tone without being identical to the adjacent tone, so long as it is a threshold value that can preserve at least 50% of the average density difference 0.25, from the adjacent tone (a density difference from the adjacent tone remains at 0.125 or higher, even after compression and expansion).

In the embodiment, the average density preservability is used for representation. However, the pseudo tone processor a 5 and the JPEG compression unit 6 use an average color difference instead of the average density, to execute the processes with respect to a color difference signal CbCr. In any case, in one embodiment, the "mean value" is preserved, and there is no supplementation when a signal attribute is different. The same applies in examples described below.

According to the embodiment, the pseudo tone processor a 5 performs the pseudo tone processing to reduce the number of bits, and then in the procedure for JPEG compression, a mean value within the area corresponding to the JPEG block size is preserved even after compression and expansion, and the frequency for pseudo tone processing is set within a favorable range also with respect to the visual performance. Therefore, the tone corresponding to the number of bits larger than 8 bits can be roughly preserved, thereby suppressing occurrence of noise and texture perceivable by the eyes due to the pseudo tone processing, even when an image stored in the HDD is displayed on the monitor.

Figure 11:
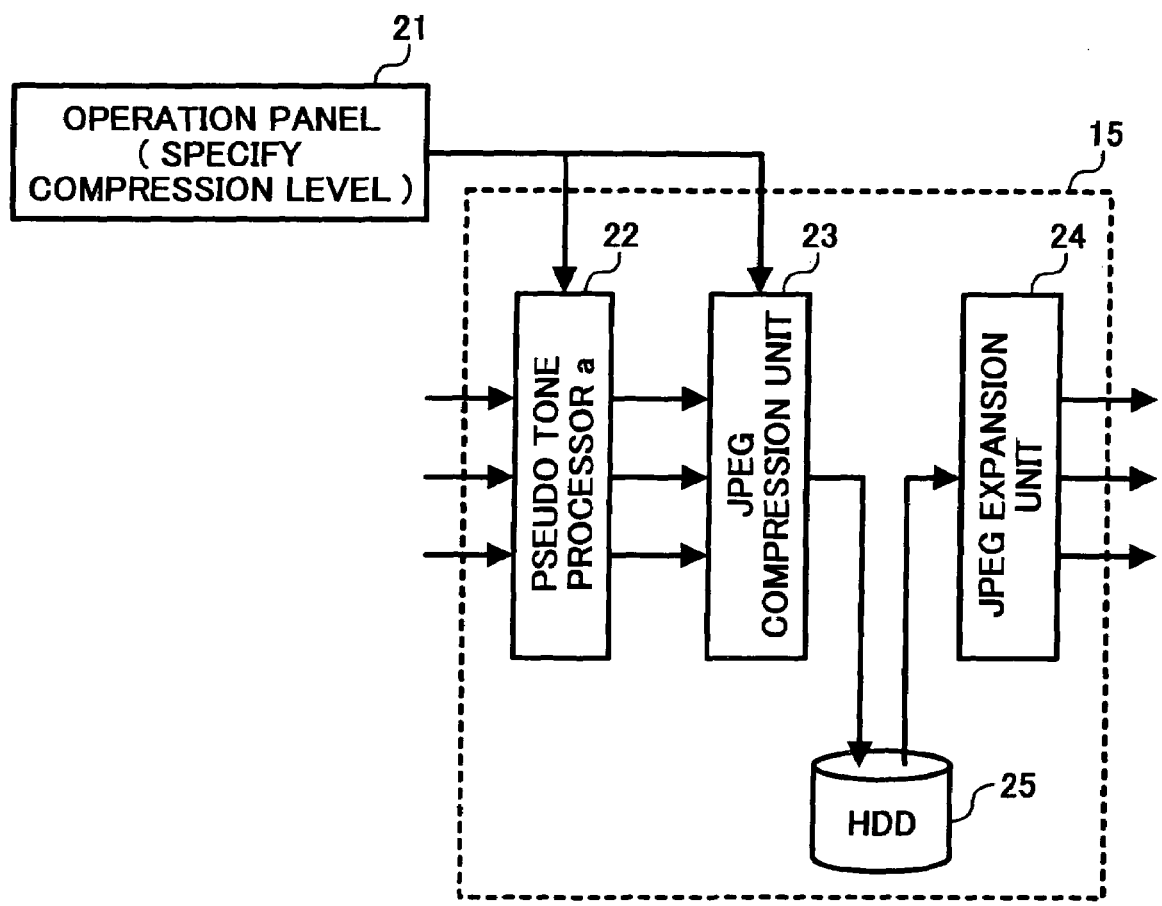
FIG. 11 is a functional block diagram of an image processing apparatus according to a first embodiment.

FIG. 11 is a functional block diagram of the image processing apparatus 15 according to a first embodiment. The image processing apparatus in this embodiment has a function for specifying the compression level via an operation panel 21. More specifically, the scaling factor in a JPEG compression unit 23 can be changed, and hence, the compression level can be changed. In comparison with FIG. 3, the configuration is such that the scaling factor setting unit 67 becomes variable.

Figure 12A:
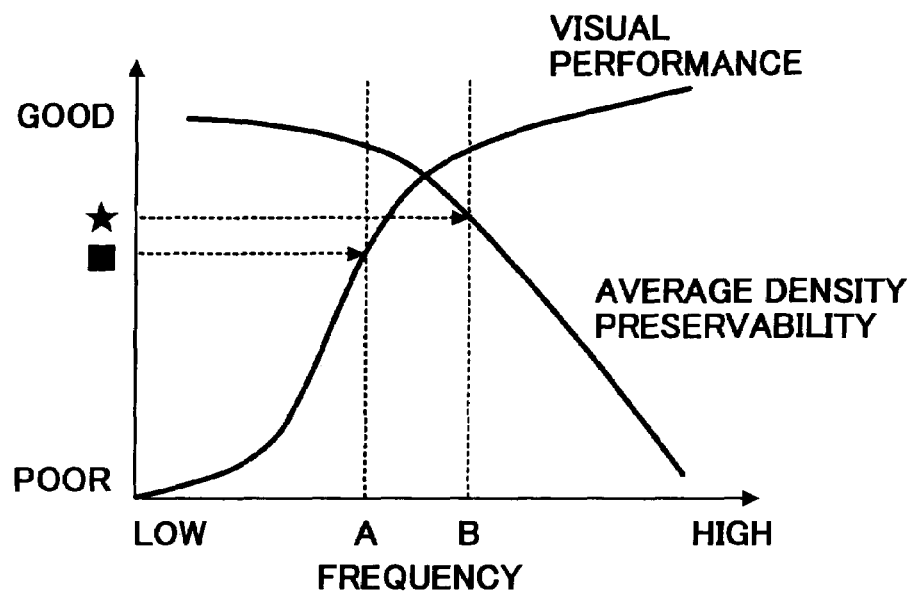
FIGS. 12A and 12B illustrate a difference in average density preservability according to a compression level of the image processing apparatus shown in FIG. 11.
Figure 12B:
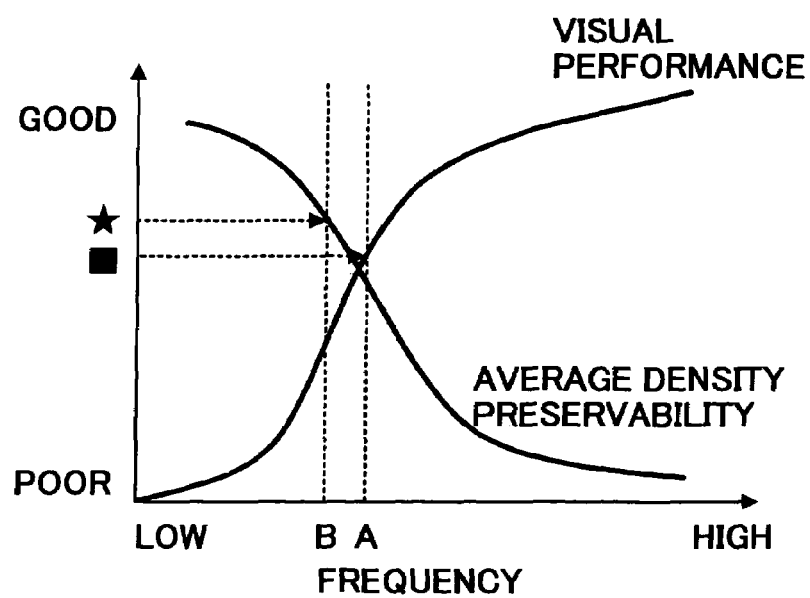

FIGS. 12A and 12B illustrate a difference in the average density preservability according to the compression level of the image processing apparatus. When the compression level of the image processing apparatus changes, the average density preservability also changes. In the case of a low compressibility (small quantization), the average density preservability from the intermediate frequency to the high frequency improves, and in the case of a high compressibility (large quantization), the average density preservability decreases.

Figure 13A:
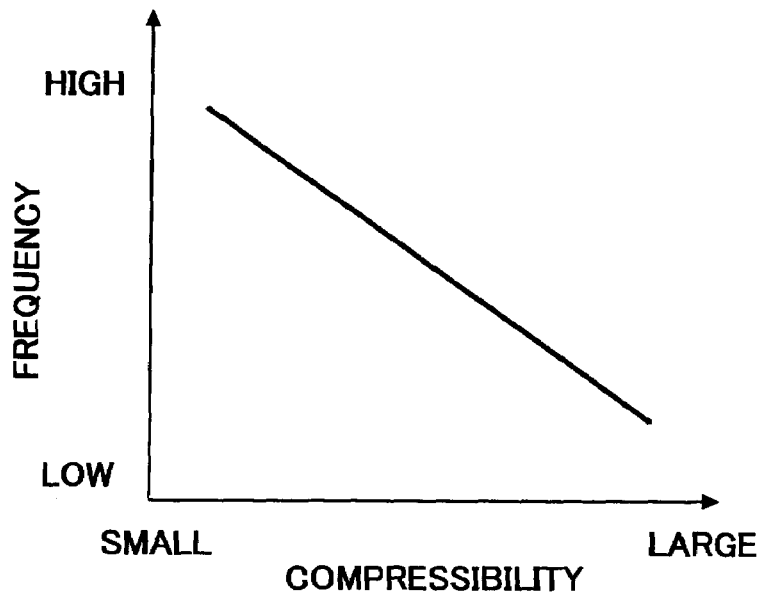
FIG. 13A illustrates changes in a frequency characteristic of a dither pattern corresponding to the compressibility in the image processing apparatus shown in FIG. 11.

FIG. 13A illustrates changes in the frequency characteristic of a dither pattern corresponding to the compressibility in the image processing apparatus. Thus, by changing the frequency characteristic of the dither pattern corresponding to the compressibility, the average density preservability can be kept constant regardless of the compressibility.

Figure 13B:
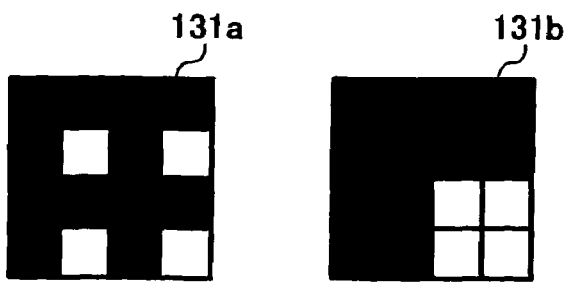
FIG. 13B is a diagram to illustrate the frequency characteristic of the dither pattern.

FIG. 13B is a diagram to illustrate the frequency characteristic of the dither pattern. The frequency characteristic of the dither pattern characterizes whether the frequency of an image generated by the dither pattern is high or low. For example, the operation by a mask 130a and a mask 130b of two dither threshold values shown in FIG. 13B is studied, as in the above explanation. If 129 pixels are expressed by black, and 128 pixels are expressed by white, the results of applying the masks 130a and 130b of the dither threshold value become an image 131a and an image 131b, respectively. The images 131a and 131b are the results of halftone processing, and are the same as seen from the mean value of 4×4 pixels, but the image 131a has a high frequency, and the image 131b has a low frequency. That is, the threshold masks 130a and 130b of the dither pattern shown in FIG. 13B respectively form a high frequency image 131a, and a low frequency image 131b.

In the case of high compressibility, as shown in FIG. 12B, the relation between A and B is reversed, and setting of the frequency characteristic in the range of higher than A and lower than B may not be possible. In this case, either of the visual performance and the average density preservability is given priority, to set the frequency of the dither pattern to either A or B. However, when A and B are reversed, a pseudo tone processor a 22 is substantially turned off, to simply omit the low-order 2 bits. By giving priority to the visual performance, the average density preservability is sacrificed. However, the average density preservability can be prevented from becoming unsatisfactorily insufficient, and unnecessary texture can be prevented from becoming noticeable after the JPEG compression and expansion.

Figure 14:
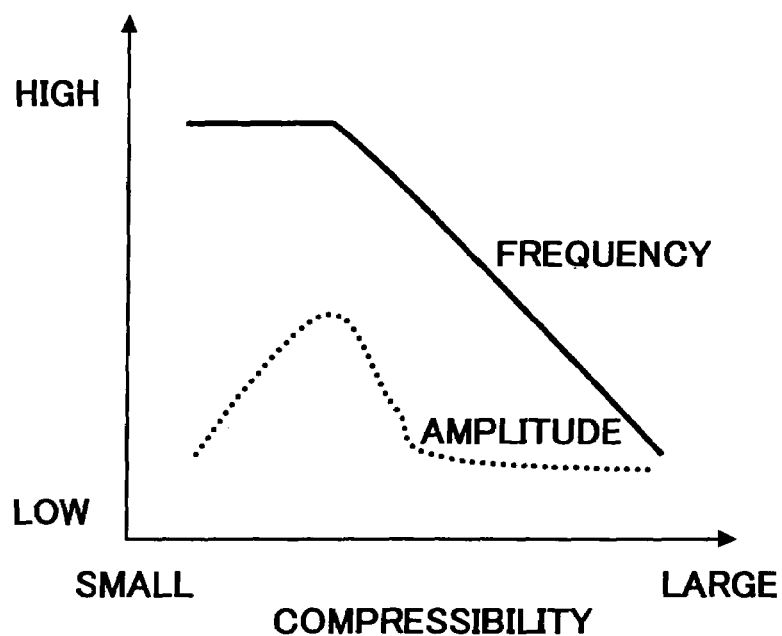
FIG. 14 is a graph to illustrate that in addition to switchover of the frequency of the dither pattern, amplitude is changed in the image processing apparatus shown in FIG. 11.

FIG. 14 is a graph to illustrate that in addition to switchover of the frequency of the dither pattern, the amplitude is changed in the image processing apparatus. In FIG. 14, it is effective to change the amplitude, in addition to switchover of the frequency of the dither pattern. That is, if the amplitude is increased, even if the tone difference decreases as shown in FIG. 6B, the tone difference hardly becomes zero, and hence, it is advantageous for preserving the average density.

Figure 15:
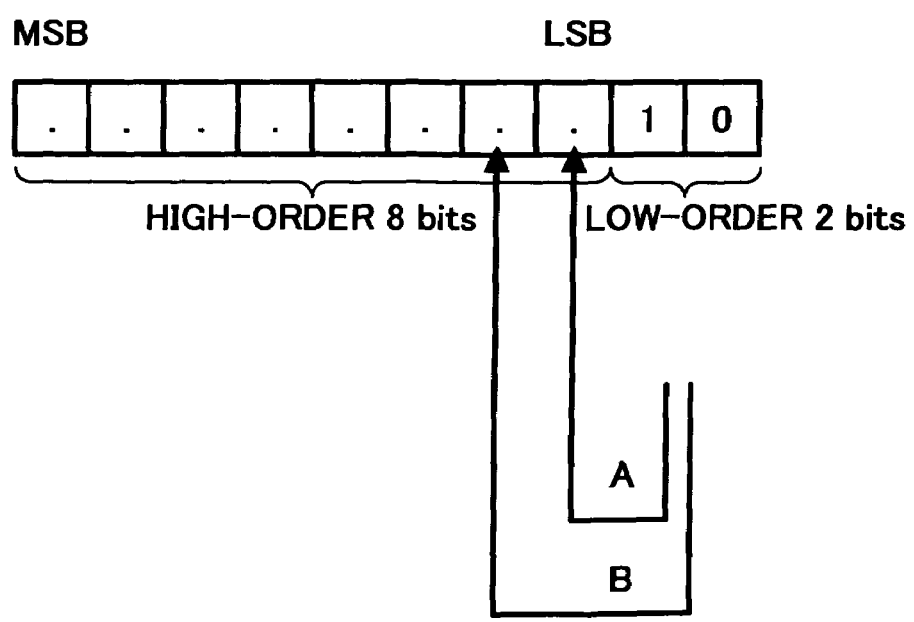
FIG. 15 is a diagram to illustrate a reflection method of omitted bits in the image processing apparatus shown in FIG. 11.

FIG. 15 is a diagram to illustrate a reflection method of omitted bits in the image processing apparatus. In the embodiments explained above, the omitted bits are reflected by adding the bits to the LSB of the high-order 8 bits (A in FIG. 15), to increase the amplitude. However, the omitted bits may be reflected on bits other than the LSB (B in FIG. 15). Furthermore, the tone corresponding to 10 bits can be preserved by the area coverage modulation.

For example, adding the dither pattern 3-2 in FIG. 9 to the LSB, and adding the dither pattern 3-1 in FIG. 9 to a position one bit higher than the LSB have the same meaning as the average density of 8×8 pixels.

According to this embodiment, even an apparatus having a function capable of setting the compressibility can roughly preserve the tone corresponding to the number of bits larger than 8 bits, regardless of the compressibility, and when an image stored in the HDD is displayed on the monitor, the noise and texture perceivable by the eyes due to the pseudo tone process, is not generated.

Figure 16:
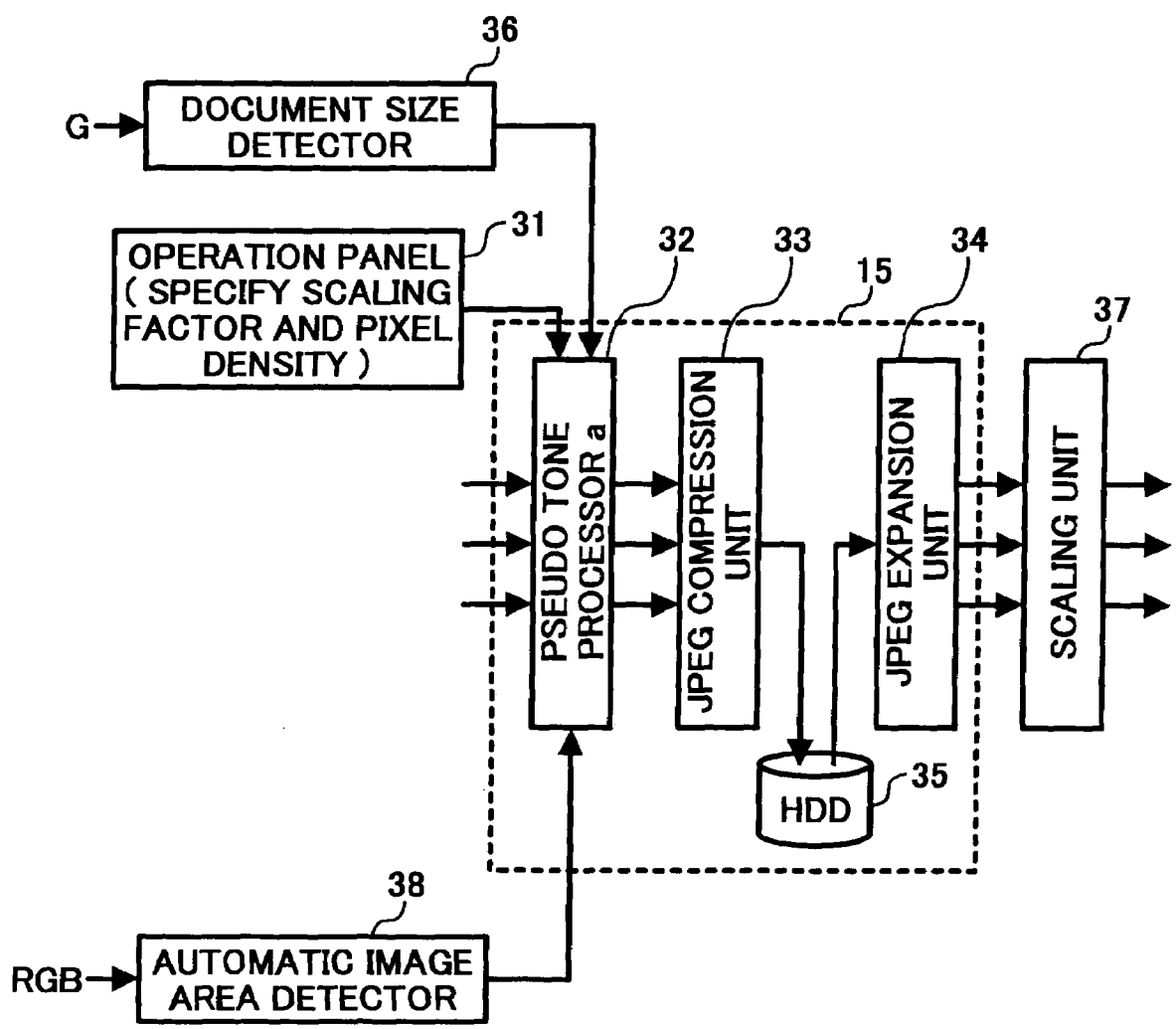
FIG. 16 is a functional block diagram of an image processing apparatus according to a second embodiment.

FIG. 16 is a functional block diagram of an image processing apparatus according to a second embodiment. In the image processing apparatus 15 in this embodiment, an operation panel 31 accepts the scaling factor to be set, and a pixel density to be set of an image stored in the HDD, an image transmitted from external equipment, and an image output from a printer. A document size detector 36 detects the document size automatically. An automatic image area detector 38 detects a pattern area in an image to detect the size of the pattern area. The frequency setting of a pseudo tone processor a 32 is switched over as in the second embodiment, corresponding to the value set or the value detected by these units.

Figure 17A:
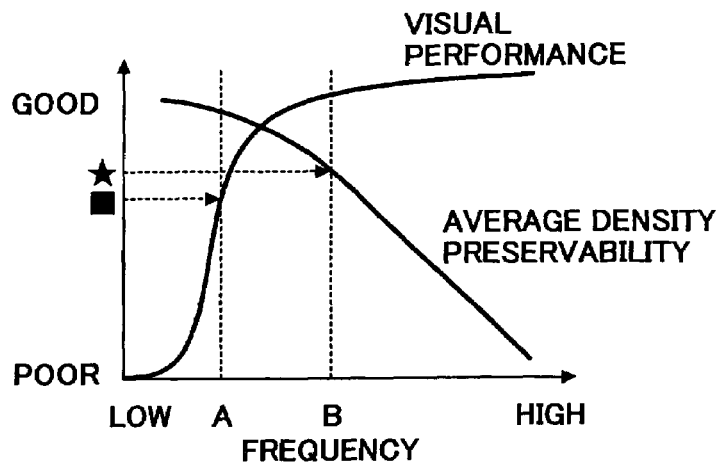
FIG. 17A is another diagram to illustrate the relation between visual performance and average density preservability by JPEG.

FIG. 17A is another diagram to illustrate the relation between the visual performance and the average density preservability by JPEG. Generally, the larger the document size is, the larger the observation distance becomes. For example, assuming that FIG. 10 represents the relation between the visual performance and the average density preservability with respect to the postcard size, the relation with respect to the A3 size is as shown in FIG. 17A, in which the flexibility improves for frequency setting, and hence the movement is advantageous.

On the other hand, even if the document size is large, and if the actual pattern area is small, the observation distance does not increase. Further, the demand for suppressing image quality degradation by preserving the average density is basically because of a pattern area represented by a gradation image. When character images occupy a large area, it is generally not necessary to switchover the frequency setting according to the document size.

The automatic image area detector 38 shown in FIG. 16 automatically extracts a pattern as an image area, in a rectangular area surrounding a halftone dot pattern and a photograph pattern by integrating pattern areas detected in a unit of pixel or in a unit of block. The automatic image area detector 38 detects pattern areas of an image in a rectangular shape, and provides control such that when the number of pixels detected as a pattern area is large, the frequency setting similar to the case of large document size is performed, but when the number of pixels is small, even if the document size is large, frequency setting is not performed in such a manner.

Figure 17B:
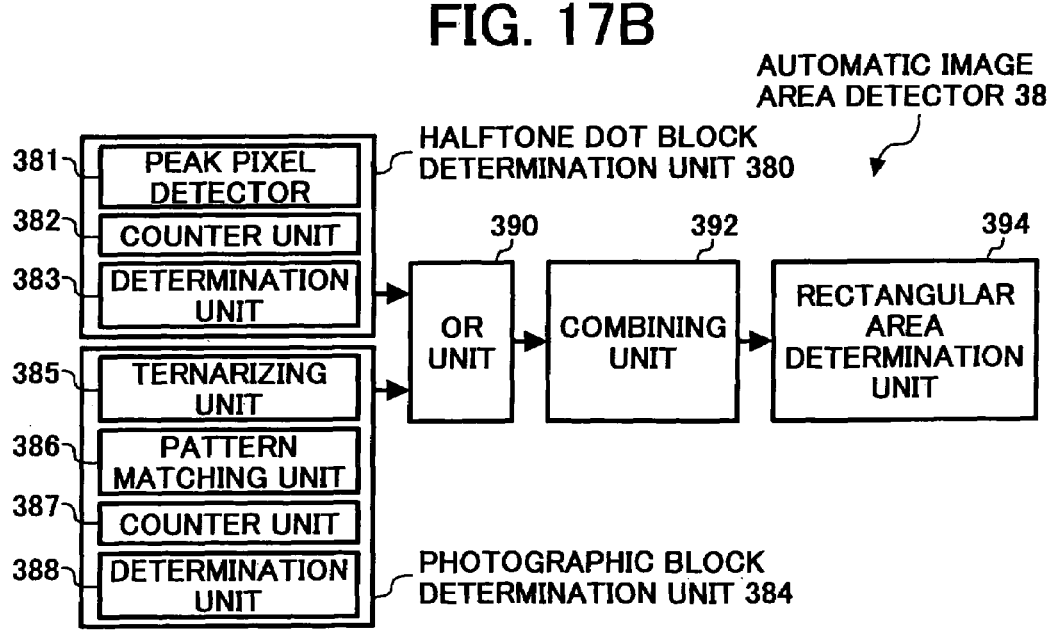
FIG. 17B is a functional block diagram of an automatic image area detector.

FIG. 17B is a functional block diagram of the automatic image area detector. The automatic image area detector 38 includes a halftone dot block determination unit 380, a photographic block determination unit 384, an OR unit 390, a combining unit 392, and a rectangular area determination unit 394.

A peak pixel detector 381 in the halftone dot block determination unit 380 determines, from the density relation with surrounding pixels, whether a target pixel is a pole indicating a peak in density changes. With reference to M×M pixels (in this case, 5×5 pixels) the peak pixel detector 381 detects a central pixel as a peak pixel, when an absolute value of the density difference between a mean value of two pixel levels located in symmetric positions putting the central pixel therebetween and the central pixel is larger than a predetermined threshold value.

A counter unit 382 counts the number of peak pixels in a block, in a unit of block of a predetermined size. When the number of peak pixels is larger than a predetermined threshold value, a determination unit 383 determines that the target block is a halftone dot block. For example, assuming that one block has 8×8 pixels, when there are 12 or more peak pixels in a block, the block is determined to be a halftone dot block.

In the photographic block determination unit 384, a ternarizing unit 385 performs a ternarizing process with two threshold values. A pattern matching unit 386 performs pattern matching with respect to an intermediate level pixel of the ternarized values. For example, when all 3×3 pixels are intermediate level pixels, the target pixel is output as a photographic pixel. A counter unit 387 counts the number of photographic pixels in a block, in a unit of block of a predetermined size. When the number of photographic pixels is larger than a predetermined threshold value, a determination unit 388 determines that the target block is a photographic block. For example, assuming that one block has 8×8 pixels, when there are 30 or more photographic pixels in a block, the block is determined to be a photographic block.

The OR unit 390 designates the target block determined as a halftone dot block by the halftone dot block determination unit 380, and the target block determined as a photographic block by the photographic block determination unit 384, as an active block.

Figure 17C:
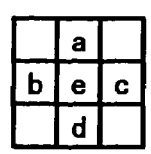
FIG. 17C is a diagram to illustrate an operation of a combining unit in the automatic image area detector.

FIG. 17C is a diagram to illustrate an operation of a combining unit in the automatic image area detector for determining the active block. The combining unit 392 refers to upper, left, right, and lower blocks a, b, c, and d with respect to the target block e shown in FIG. 17C. When a and b are active blocks, a and c are active blocks, d and b are active blocks, or d and c are active blocks, the combining unit 392 determines that the target block is an active block. This process is repeated a predetermined number of times (in this case, 10 times). When the size of the active block is equal to or larger than a predetermined size (for example, 20 mm×20 mm) after processing by the combining unit 392, the rectangular area determination unit 394 determines that the block is a pattern area.

The same applies to the pixel density, and if the pixel density is high, the relation between the visual performance and the average density preservability becomes as shown in FIG. 17A.

Thus, when a scaling unit 37 that performs scaling is provided after the expansion process by a JPEG expansion unit 34, the frequency of the dither pattern added by the pseudo tone processor a 32 that observes the image as a printer output image is different from the frequency immediately after the processing by the pseudo tone processor a 32. Taking this matter into consideration, it is an effective method to change over the frequency of the dither pattern beforehand, based on the scaling factor.

The document size detector 36 and the automatic image area detector 38 may specify the document size and the image area via the operation panel 31 as for the scaling factor and the like. Alternatively, when the automatic image area detector 38 detects the image area automatically, a method of detecting the image area from a prescanned image or from an image stored in the memory is effective.

According to this example, even when the apparatus has a function for setting or automatically obtaining parameters that affect the visual performance such as the document size, the pattern area size, the scaling factor, and the pixel density, the tone corresponding to the number of bits larger than 8 bits can be roughly preserved as in the first embodiment, regardless of the parameter values. Displaying the image stored in the HDD on the monitor further prevents the occurrence of noise and texture perceivable by the eyes due to the pseudo tone process.

Figure 18:
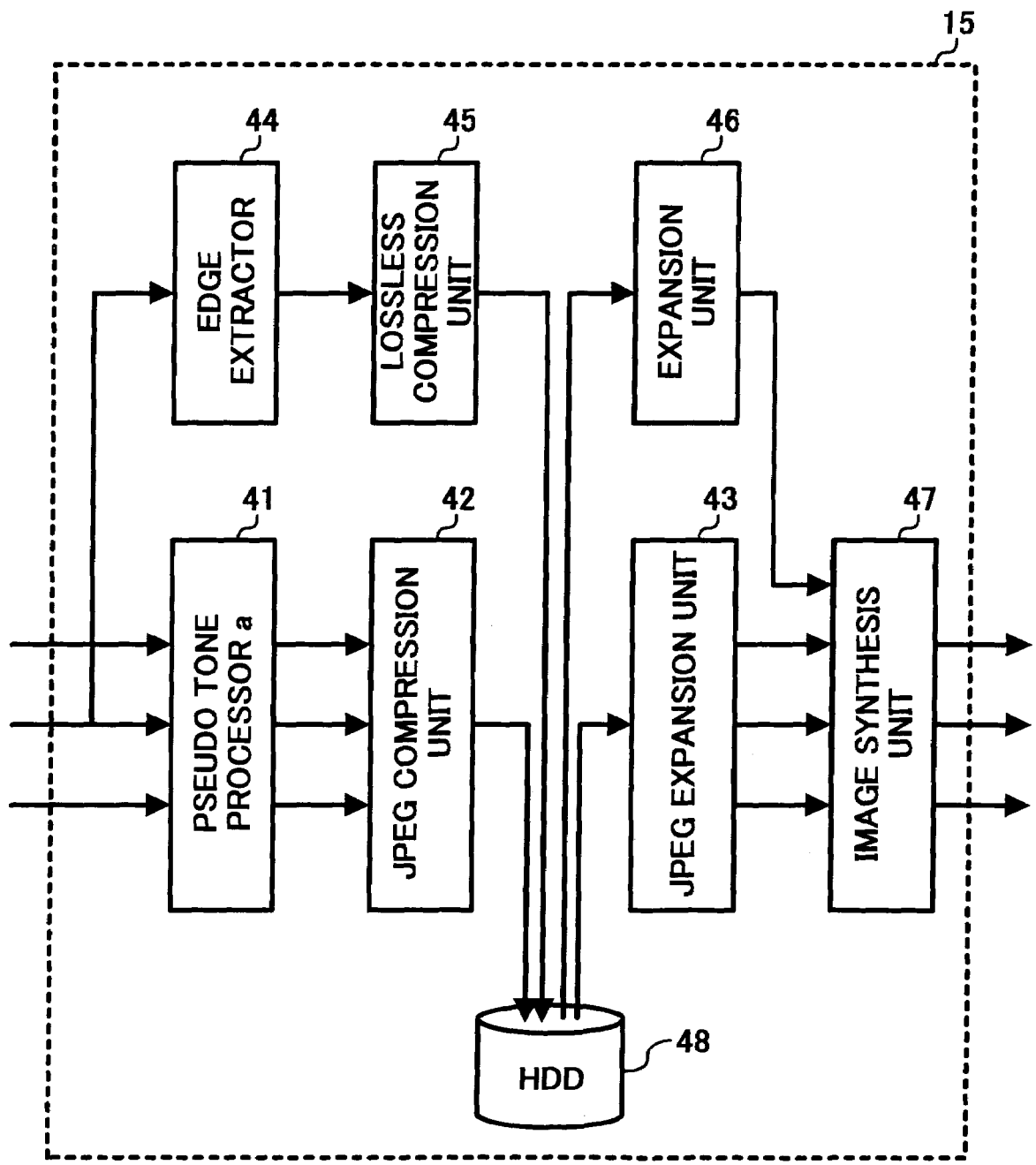
FIG. 18 is a functional block diagram of an image processing apparatus according to a third embodiment.

FIG. 18 is a functional block diagram of an image processing apparatus according to a third embodiment. The image processing apparatus 15 in this embodiment includes an edge extractor 44 that generates a signal capable of responding by an edge of an image, and an image synthesis unit 47 that synthesizes an image after the JPEG expansion. As shown in FIGS. 6A and 6B, in an image after compression and expansion, high frequency components attenuate and edge components are weakened. Therefore, the weakened edge components (ideally, a difference between before and after the compression, but such a high precision is not required) are generated from the signal before the JPEG compression, stored, and subjected to image synthesis, to restore the sharpness of the edge. In FIG. 18, the edge extractor 44 uses a signal before a pseudo tone processor a 41, but a signal immediately before the JPEG compression may be used therefor.

For example, consider that the number of bits before the pseudo tone process is 30 bits (10 bits×3 colors), the number of bits after the pseudo tone process is 24 bits (8 bits×3 colors), and the number of bits of the edge signal, being the edge extraction result, is 2 bits. Comparing this with an instance in which the image data for 30 bits is stored in an HDD 18 without performing the pseudo tone process, even if the number of bits after the pseudo tone process and the number of bits of the edge signal are added up, the effect of reducing the number of bits as an image stored in the HDD can be comprehensively maintained.

Thus, according to the third embodiment, in addition to the effect of preserving the tone as in the second embodiment, there is an effect of preserving the sharpness of the edge, being a problem in the lossy compression.

Figure 19:
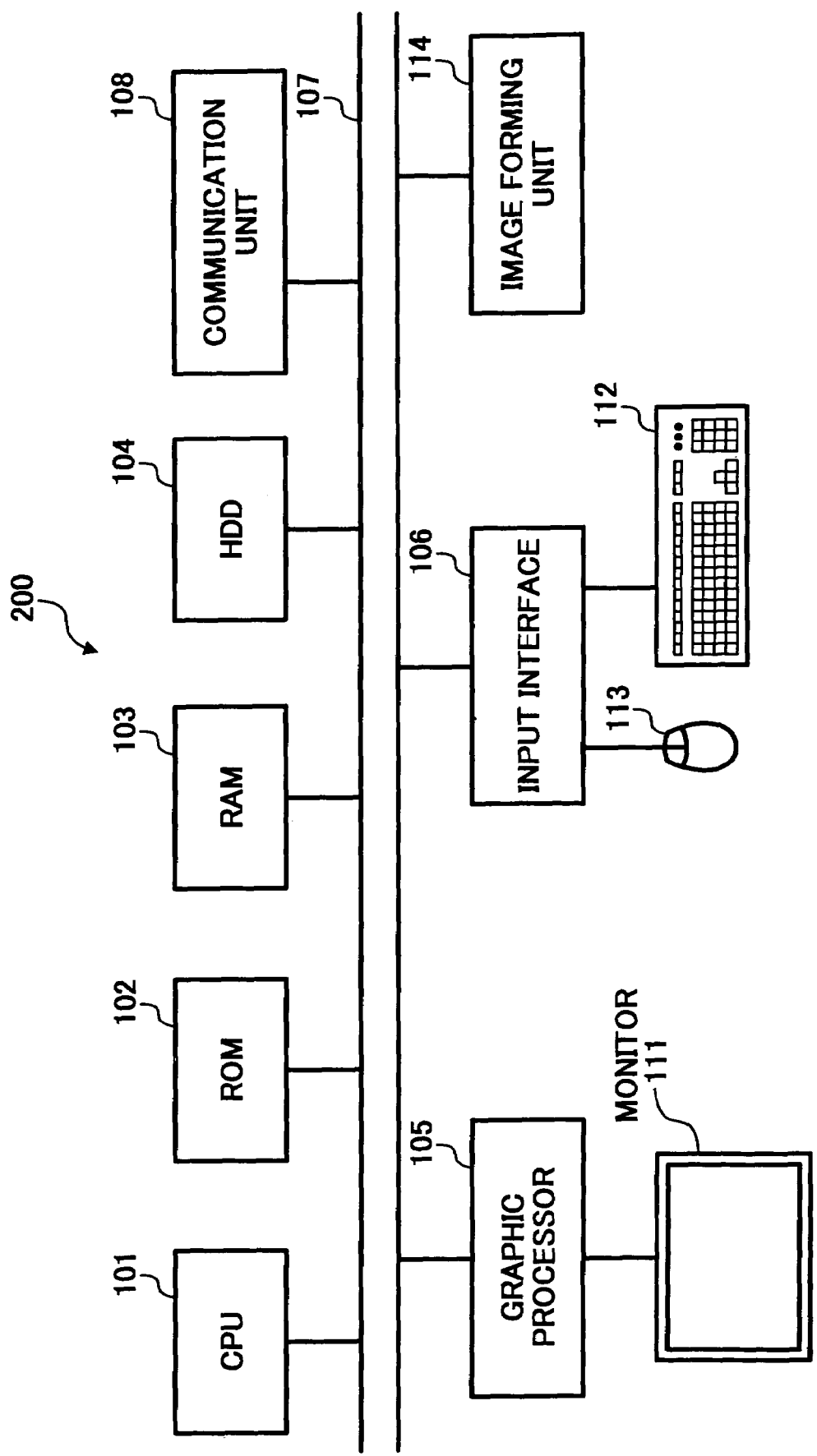
FIG. 19 illustrates an example of a hardware configuration of the image processing apparatus.

FIG. 19 illustrates an example of a hardware configuration of the image processing apparatus according to the embodiment. The image processing apparatus can be realized by executing a program, prepared in advance, in a computer system such as a personal computer or a workstation. In a computer 200, the whole apparatus is controlled by a central processing unit (CPU) 101. A read only memory (ROM) 102, a random access memory (RAM) 103, a hard disk drive (HDD) 104, a graphic processor 105, and an input interface 106 are connected to the CPU 101 via a bus 107. The program for the operating system (OS) and at least a part of application programs to be executed by the CPU 101 are stored in the ROM 102 and the RAM 103. The RAM 103 also stores various types of data required for the processing by the CPU 101. The OS, various kinds of driver programs, application programs, and detected data are stored in the HDD 104.

The graphic processor 105, the input interface 106, and an image forming unit 114 are connected to the bus 107. A monitor 111 is connected to the graphic processor 105. The graphic processor 105 allows an image to be displayed on the monitor 111 according to an instruction from the CPU 101. A keyboard 112 and a mouse 113 are connected to the input interface 106. The input interface 106 transmits a signal transmitted through the keyboard 112 and the mouse 113 to the CPU 101 via the bus 107. The image forming unit 114 forms an image.

The processing functions in the embodiments described above can be realized by such a hardware configuration. In order to realize the embodiments on the computer 200, the driver program is installed therein.

The image processing program executed by the image processing apparatus in the embodiments is recorded on a computer-readable recording medium such as a CD-ROM, a floppy (registered trademark) disk, or a digital versatile disk (DVD), in a file in an installable format or an executable format.

The image processing program in the embodiments may be provided and distributed by storing the program on a computer connected to a network such as the Internet and having the program downloaded via the network.

Thus, according to one embodiment of the present invention, in an image formation process in which lossy compression is performed after the pseudo tone processing, if the number of bits at the time of lossy compression is N, then the tone corresponding to M bits, where M is larger than N, can be roughly preserved even after compression.

Moreover, if the lossy compression is block compression in which compression is performed in a unit of block, a mean value corresponding to the M bits is preserved.

Furthermore, even after the lossy compression, a difference between the mean value of adjacent tones in the M-bit image data can be preserved more than 50%.

Moreover, in an apparatus having a compression level setting unit, a certain mean value can be preserved regardless of the compression level, and the tone corresponding to M bits can be preserved at all times.

Furthermore, in an apparatus having a function for variably setting a parameter of the image size, which affects the visual performance, both the mean value preservability and the visual performance can be substantially obtained regardless of the parameter, and the tone corresponding to M bits can be preserved.

Moreover, in an apparatus having a function for variably setting a parameter of the pattern area size, which affects the visual performance, both the mean value preservability and the visual performance can be substantially obtained regardless of the parameter, and the tone corresponding to M bits can be preserved.

Furthermore, in an apparatus having a function for variably setting a parameter of the scaling factor for scaling an image, which affects the visual performance, both the mean value preservability and the visual performance can be substantially obtained regardless of the parameter, and the tone corresponding to M bits can be preserved.

Moreover, in an apparatus having a function for variably setting a parameter of the pixel density, which affects the visual performance, both the mean value preservability and the visual performance can be substantially obtained regardless of the parameter, and the tone corresponding to M bits can be preserved.

Furthermore, the compression level, the image size, the pattern area size, the scaling factor, and the pixel density are parameters for varying the pseudo tone processing frequency, and the pseudo tone processing is performed only when at least one parameter from among the compression level, the image size, the pattern area size, the scaling factor, and the pixel density, is within a predetermined range.

Moreover, the flexibility in setting the frequency that can obtain both the mean value preservability and the visual performance improves by varying the amplitude as well as the frequency for the pseudo tone processing.

According to another embodiment of the present invention, the sharpness of the edge after the lossy compression and expansion can be restored in addition to preserving the mean value, degradation in an image due to the lossy compression can be further reduced, and an excellent image can be obtained.

Moreover, number of bits in the image reduces, and the HDD storage capacity can also be reduced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a pseudo tone processor to perform a pseudo tone process by performing an area coverage modulation expression process with respect to M-bit image data, to thereby convert the M-bit image data to N-bit image data, wherein N is smaller than M; and
a lossy compressor to perform lossy compression with respect to the N-bit image data by suppressing fluctuations in a pseudo tone processing frequency within a certain range.

2. The image processing apparatus according to claim 1, wherein
the lossy compressor performs the lossy compression with respect to the N-bit image data for each unit block, and
the lossy compressor performs the lossy compression so that, even after the lossy compression is performed, the pseudo tone processing frequency is maintained at a frequency that suppresses fluctuations of a mean value corresponding to the M bits, within a certain range in each unit block.

3. The image processing apparatus according to claim 2, wherein
the lossy compressor performs the lossy compression so that, even after the lossy compression is performed, a difference between the mean value of adjacent tones in the M-bit image data is more than 50%.

4. The image processing apparatus according to claim 1, further comprising:
a compression level setting unit to set the compression level of the lossy compressor, and wherein
the lossy compressor performs the lossy compression so that the pseudo tone processing frequency is variable according to the compression level set.

5. The image processing apparatus according to claim 1, further comprising:
an image size acquiring unit to acquire at least one of length and width of the image data, and the number of pixels in the image data, as image size information, and wherein
the lossy compressor performs the lossy compression so that the pseudo tone processing frequency is variable according to the image size information acquired.

6. The image processing apparatus according to claim 1, further comprising:
a pattern area size acquiring unit to acquire a size of a pattern area in the image data, and wherein
the lossy compressor performs the lossy compression so that the pseudo tone processing frequency is variable according to the size of the pattern area acquired.

7. The image processing apparatus according to claim 1, further comprising:

a scaling factor acquiring unit to acquire a scaling factor for scaling the image data;

an expansion unit to expand the lossy-compressed image data; and a scaling unit to perform scaling with respect to the image data expanded, based on the scaling factor acquired; and wherein the lossy compressor performs the lossy compression so that the pseudo tone processing frequency is variable according to the scaling factor acquired.

8. The image processing apparatus according to claim 1, further comprising:

a post-compression processor to perform, after the lossy compression, at least one process from among outputting the lossy-compressed image data, storing the lossy-compressed image data, and transmitting the lossy-compressed image data; and a pixel density acquiring unit to acquire a pixel density at the time of processing by the post-compression processor; and wherein the lossy compressor performs the lossy compression so that the pseudo tone processing frequency is variable according to the pixel density acquired.

9. The image processing apparatus according to claim 1, further comprising:

a compression level setting unit to set the compression level of the lossy compressor;

an image size acquiring unit to acquire at least one of length and width of the image data, and the number of pixels in the image data, as image size information;

a pattern area size acquiring unit to acquire a size of a pattern area in the image data;

a scaling factor acquiring unit to acquire a scaling factor for scaling the image data; and a pixel density acquiring unit to acquire a pixel density; wherein the compression level, the image size, the pattern area size, the scaling factor, and the pixel density are parameters for varying the pseudo tone processing frequency; and the pseudo tone processor performs the pseudo tone process with respect to the image data, only when at least one of the compression level, the image size, the pattern area size, the scaling factor, and the pixel density, is within a predetermined range.

10. The image processing apparatus according to claim 4, wherein the pseudo tone processor performs the pseudo tone process so that both, the pseudo tone processing frequency and a pseudo tone processing amplitude, are variable.

11. The image processing apparatus according to claim 5, wherein the pseudo tone processor performs the pseudo tone process so that both, the pseudo tone processing frequency and a pseudo tone processing amplitude, are variable.

12. The image processing apparatus according to claim 6, wherein the pseudo tone processor performs the pseudo tone process so that both, the pseudo tone processing frequency and a pseudo tone processing amplitude, are variable.

13. The image processing apparatus according to claim 7, wherein the pseudo tone processor performs the pseudo tone process so that both, the pseudo tone processing frequency and a pseudo tone processing amplitude, are variable.

14. The image processing apparatus according to claim 8, wherein the pseudo tone processor performs the pseudo tone process so that both, the pseudo tone processing frequency, and a pseudo tone processing amplitude, are variable.

15. An image processing apparatus comprising:

a pseudo tone processor to perform a pseudo tone process by performing an area coverage modulation expression process with respect to image data, to thereby reduce a number of bits of the image data;

a lossy compressor to perform lossy compression with respect to the image data subjected to the pseudo tone process;

an edge extractor to extract an edge amount from the image data before the lossy compression; and an image synthesizing unit to synthesize the image data subjected to the lossy compression and the edge amount extracted.

16. The image processing apparatus according to claim 15, wherein the pseudo tone processor performs the pseudo tone process so that a total number of the bits of the image data after the pseudo tone process and the edge amount extracted, does not exceed a number of the bits of the image data before the pseudo tone process.

17. An image processing method comprising:

pseudo tone processing by performing an area coverage modulation expression process with respect to M-bit image data to convert the M-bit image data to N-bit image data, wherein N is smaller than M; and performing lossy compression with respect to the N-bit image data by suppressing fluctuations in a pseudo tone processing frequency within a certain range.

18. An image processing method comprising:

pseudo tone processing by performing an area coverage modulation expression process with respect to image data to reduce a number of bits of the image data;

performing lossy compression with respect to the image data subjected to the pseudo tone process;

extracting an edge amount from the image data before the performing; and synthesizing the image data subjected to the lossy compression and the edge amount extracted.

19. A computer-readable recording medium that records thereon a computer program including instructions, which when executed, make a computer execute:

pseudo tone processing by performing an area coverage modulation expression process with respect to M-bit image data to convert the M-bit image data to N-bit image data, wherein N is smaller than M; and performing lossy compression with respect to the N-bit image data by suppressing fluctuations in a pseudo tone processing frequency within a certain range.

20. A computer-readable recording medium that records thereon a computer program including instructions, which when executed, cause a computer to perform a method comprising:

pseudo tone processing by performing an area coverage modulation expression process with respect to image data to reduce a number of bits of the image data;

performing lossy compression with respect to the image data subjected to the pseudo tone process;

extracting an edge amount from the image data before the performing; and synthesizing the image data subjected to the lossy compression and the edge amount extracted.

* * * * *